Nov. 11, 1969  P. J. SIX  3,477,781
WEIGHING MACHINE WITH OPTICAL PROJECTION
Filed May 6, 1966

INVENTOR
PIETER JACOB SIX

BY
Marshall, Johnston, Cook & Root
ATTORNEYS

United States Patent Office 3,477,781
Patented Nov. 11, 1969

3,477,781
WEIGHING MACHINE WITH OPTICAL PROJECTION
Pieter Jacob Six, Wassenaar, Netherlands, assignor to Maatschappij Van Berkel's Patent N.V., Rotterdam, Netherlands, a limited liability company of the Netherlands
Filed May 6, 1966, Ser. No. 548,180
Claims priority, application Germany, May 8, 1965, 1,272,015
Int. Cl. G03b 21/14, 21/28, 23/02
U.S. Cl. 353—22    10 Claims

ABSTRACT OF THE DISCLOSURE

A weighing machine having an optical projection system which includes a readout device having a transparent scale with a plurality of superposed parallel spaced image planes of data through which illumination is projected. Objective lens apparatus projects data from the image planes onto a screen. A device coacts with the objective lens apparatus so that only one image is projected onto the screen at any one time while maintaining the distance between the transparent scale and objective lens apparatus fixed. In one embodiment, the device is a shutter, and in another embodiment the device is a plano-parallel glass plate.

---

This invention relates in general to a weighing machine, and more particularly to optical weighing apparatus wherein weight and/or price data is read out in response to goods weighed by the apparatus, and still more particularly to a readout device for optical weighing apparatus capable of increasing the capacity of data to be read out, and still more particularly to a readout device including a scale having a plurality of parallel spaced image planes of data through which a light source is directed and further through an objective lens means and onto a screen wherein the objective lens means is always spaced the same distance from the scale and screen by coacting with means for selecting the projection of an image from only one of the image planes. While the invention will be described as generally associated with weighing apparatus, it should be appreciated that it may have other uses and purposes apparent to one skilled in the art.

The optical element or objective lens employed in the present invention is provided with a small depth of focus so that a well defined image is projected onto a screen and so that an image from only one of the image planes is readably projected on the screen. While any number of spaced image planes of data may be provided in the transparent scale, only two are illustrated in this application for simplicity purposes. In one embodiment of the invention, an objective lens is provided for each of the image planes of data, each of which is in focus relationship with only one of the planes of data, and each of which is provided with an independent light source or source of illumination. Means is provided so that only one of the sources of illumination is effective at any one time for one of the objective lenses, and an example of such means is a diaphragm or shield which may be employed to cut off the light column of one or the other of the sources of illumination. Another embodiment of the invention employs a single objective lens that may have its focusing easily and quickly varied to selectively project an image from either of the image planes of data onto the screen. For example, the objective lens may normally provide a well defined image of one of the image planes of data on the screen, and further coact with a means for varying the focus so that it will project a well defined image of the other of the image planes of data onto the screen. Such a means may involve a plano-parallel glass plate that may be moved into the line of projection.

Heretofore, weighing machines have been provided with plural reading scales that may be turned to different positions relative to each other, and which have data adjustments for projecting simultaneously data from both scales onto a screen. In such a machine, the scales must be mounted in radially staggered positions and employed in combination with an objective lens having a large depth of focus range. Such a machine has not been satisfactory and has involved considerable maintenance problems.

In my copending patent application Ser. No. 401,422, filed Oct. 5, 1964, now Patent No. 3,302,518, a weighing apparatus having a readout device is shown where a transparent scale is provided with spaced image planes of data, and where a single objective lens is mounted relative to the scale for movement relative thereto in an axial direction toward and away from the scale to selectively focus one of the image planes of data for projection onto a screen.

It is therefore an object of the present invention to provide a reading device for a weighing apparatus which includes a transparent scale having a plurality of parallel spaced image planes of data, a light source means, a screen, objective lens means, and means for coacting with the lens so that only one image is projected onto the screen at any one time while maintaining the distance between the transparent scale and objective lens fixed, thereby greatly facilitating the manipulation of the weighing apparatus.

Another object of this invention resides in the provision of a readout device for a weighing apparatus wherein an objective lens is employed for each of a plurality of image planes of data in a transparent scale, and light source means is also provided for each of the objective lens, and diaphragm means is employed for selectively cutting off one of the light sources so that only one image of data is projected onto the screen at any one time.

A still further object of the invention is to provide a readout device for a weighing apparatus including a transparent scale having a plurality of parallel spaced image planes of data and a single objective lens fixed relative to movement toward and away from the scale, and wherein means is provided to vary the depth of focus range of the objective scale, and especially by way of a plano-parallel glass plate that may be positioned in the light column between the scale and objective lens.

Other objects, features and advantages of the invention will be apparent from the following detailed disclosure, taken in conjunction with the accompanying sheet of drawing, wherein like reference numerals refer to like parts, in which.

Figure 2:
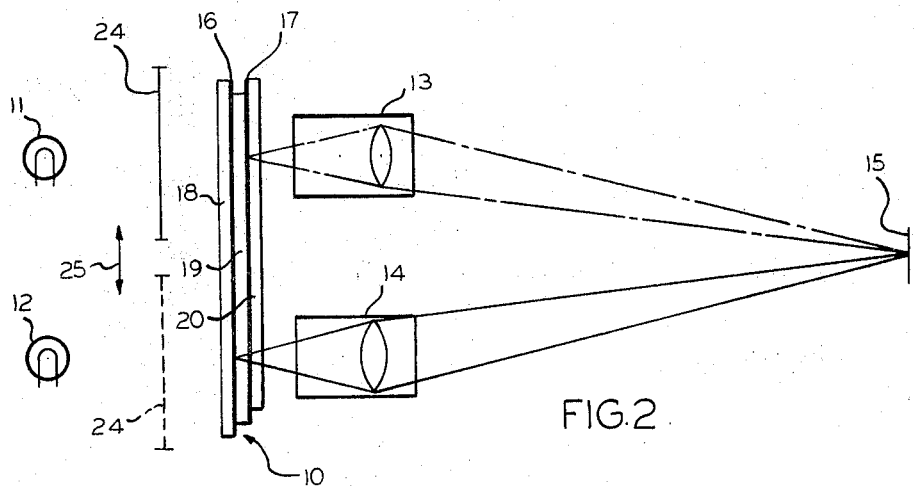
FIG. 2 is a diagrammatic view of a readout device for a weighing apparatus in accordance with the present invention.

Referring now to the drawings, and particularly to FIG. 2, the readout device illustrated in accordance with the present invention includes a transparent scale 10, light sources 11 and 12 for generating illumination and projecting images from the scale 10, objective lenses 13 and 14 focusing on planes of data of the scale 10 and projecting same to a screen 15. It should be understood that the scale 10 and the objective lenses 13 and 14 move in response to the goods weighed on the weighing apparatus in order to project weighing and/or pricing data from the scale 10 onto the screen 15. Thus, the data on the scale 10 may be weight of the goods weighed, and/or the computed price of the goods being weighed based upon the weight and the price per pound, or other suitable information.

The transparent scale 10 is preferably of glass, and includes a pair of image planes of data 16 and 17 arranged in parallel spaced relationship and held between transparent plates or sheets of material 18, 19 and 20. The plates or sheets of material 18, 19 and 20 may be of glass, plastic, or any other suitable transparent material, and it should be appreciated that they are arranged together and will keep the image planes of data 16 and 17 free of dust and other unwanted material. While the transparent scale 10 illustrates only two image planes of data arranged together, it should be appreciated that a greater number may be employed if the capacity of a weighing apparatus is desired to be further increased.

Figure 1:
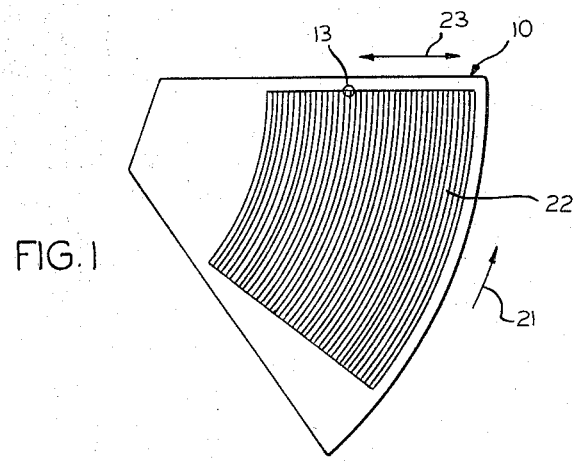
FIG. 1 is a view of a pendulum type reading scale of a weighing apparatus according to the present invention.

The illustrated transparent scale 10 is sector-shaped or pie-shaped and of the pendulum type wherein it will move on a pivot axis in the direction of the arrow 21, and may be provided thereon with a plurality of rows of price or other data 22. The objective lens 13 is illustrated in relation to the scale in FIG. 1 and would be shiftable along the rows of data 22 in a radial direction as indicated by the arrow 23. Similarly, the objective lens 14 would also be movable in a radial direction.

In the embodiment of FIG. 2, the objective lens 13 is spaced from the transparent scale 10 so that it is in focus with the image data on the image plane 17 so that the image data from this plane can be projected onto the screen 15, while the distance between the scale 10 and the objective lens 14 is such that the lens is focused for projecting the image data from the image plane of data 16 onto the screen 15. Thus, the distance between the objective lenses 13 and 14 and the scale is fixed, and each objective lens will only focus sharply the image data from one of the planes onto the screen, wherein the data from the other image plane will be not in focus and therefore not readable. The objective lenses 13 and 14 have a narrowly limited focus depth in order to only sharply project the image data from one of the image planes. The screen 15 may be of any suitable material, but preferably of frosted glass.

In order to prevent projection of image data from both of the image planes at the same time, a diaphragm or shield 24 is provided to be selectively movable in a direction as indicated by the arrow 25 between the transparent scale 10 and the light sources 11 and 12 to block or interfere with the light column of the light source 11 or the light source 12. The diaphragm or shield 24 is shown in solid lines in position between the scale 10 and the light source 11 and in dotted lines between the scale 10 and the light source 12. While interruption of the source of illumination is illustrated as being accomplished by a diaphragm, it should be appreciated that other suitable means may be provided. Further, the diaphragm may be located on either side of the scale or the objective lens, or a separate diaphragm might even be provided for each of the optical projection patterns.

Figure 3:
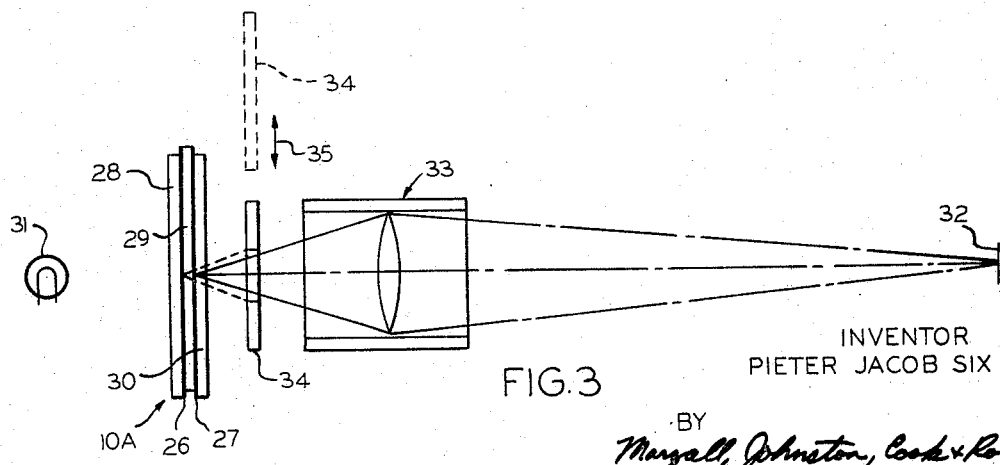
FIG. 3 is a view of a modified readout device for a weighing apparatus in accordance with the present invention.

Another embodiment of the invention is shown in FIG. 3, wherein the transparent scale is represented by the numeral 10A and having image planes of data 26 and 27 spaced apart and protected by transparent sheets of material 28, 29 and 30. A light source or source of illumination 31 is provided on one side of the scale to provide projection illumination through the scale and onto a screen 32 through a common objective lens 33. The objective lens 33 is spaced from the scale 10A at a constant fixed distance, and is a type of a lens that can have its focus varied in order to selectively project the data from the image plane 26 or the image plane 27. Again, the common objective lens 33 will have a narrowly limited focus depth which is permanently positioned in the light column of the light source 31 and is normally sharply focused on one of the image planes of data, such as the image plane 26. In order to sharply define the image from the image plane 27, means is provided for changing the focus of the objective lens 33, and as illustrated herein, that means includes a plano-parallel glass plate 34 shown in operative position in solid lines, and in inoperative position in dotted lines, and movable in the direction indicated by the arrow 35. With the glass plate 34 in operative position as shown in solid lines, the focus of the objective lens 33 might be varied for example to focus the image of the data from the image plane 27 onto the screen 32. Any other type of means may be provided for varying the focus of the objective lens 33 without changing its spacial distance from the transparent scale 10A.

It will be understood that modifications and variations may be effected without departing from the scope of the novel concepts of the present invention.

The invention is hereby claimed as follows:

1. In combination with an optical weighing apparatus, a device for reading out data responsive to the weight of goods weighed by said apparatus, said device comprising a transparent scale having a plurality of image planes of data arranged in parallel spaced relation from each other, transparent sheet means for spacing said image planes of data in said parallel spaced relation so that the image planes of data are in fixed position behind one another, light source means for providing projection illumination through said scale, a screen, a plurality of objective lenses, one objective lens for each image plane of data in focus with one of said corresponding image planes for transmitting an image from that image plane onto said screen, said objective lenses being spaced a constant fixed distance from said scale, and means for allowing the light source to function for only one of said objective lenses thereby permitting an image from a single image plane on the screen at any one time.

2. The combination as defined by claim 1, wherein said means includes a diaphragm.

3. The combination as defined by claim 1, wherein each objective lens and the scale are movable relative each other in response to the weight of goods weighed by the apparatus.

4. The combination as defined by claim 1, wherein each objective lens is movable relative the scale in response to the weight of goods weighed by the apparatus.

5. The combination as defined by claim 1, wherein said light sources means includes a light source for each of the objective lenses, and said means permits operation of one light source at a time.

6. The combination as defined by claim 1, wherein said objective lenses have a small depth of focus to thereby assure transmitting of a well defined image from only a single image plane.

7. The combination as defined by claim 1, wherein said screen is frosted glass.

8. In combination with an optical weighing apparatus, a device for reading out data responsive to the weight of goods weighed by said apparatus, said device comprising a transparent scale having a plurality of image planes of data arranged in parallel spaced relation from each other, transparent sheet means for spacing said image planes of data in said parallel spaced relation so that the image planes of data are in fixed position behind one another, a light source for providing projection illumination through said scale, a screen, objective lens means having a small depth of focus arranged between said scale and screen, and means coacting with said objective lens means to project data from only one image plane onto said screen at any one time while maintaining the distance between the transparent scale and objective lens means fixed.

9. In combination with an optical weighing apparatus, a device for reading out data responsive to the weight of goods weighed by said apparatus, said device comprising a transparent scale having a plurality of image planes of data arranged in parallel spaced relation from each other, transparent sheet means for spacing said image planes of data in said parallel spaced relation so that the image planes of data are in fixed position behind one another, a light source for providing projection illumination through said scale, a screen, an objective lens having a small depth of focus arranged between said scale and screen focusing an image from one of said image planes onto said screen, said objective lens being spaced a constant fixed distance from said scale, and means movable between said scale and objective lens to vary the focus of said lens to transmit an image from one of the other image planes to said screen.

10. The combination as defined by claim 9, wherein said movable means includes a plano-parallel glass plate.

References Cited
UNITED STATES PATENTS

| | | |
|---|---|---|
| Re. 16,091 | 6/1925 | Marten. |
| 2,180,638 | 11/1939 | McMahon et al. _____ 352—104 |
| 2,554,679 | 5/1951 | Mitchell _____ 352—140 |
| 3,191,490 | 6/1965 | Rabinow. |
| 3,358,558 | 12/1967 | Bradley. |

NORTON ANSHER, Primary Examiner

R. M. SHEER, Assistant Examiner

U.S. Cl. X.R.

352—140; 353—25, 41, 81, 89